(12) United States Patent
Takishita et al.

(10) Patent No.: US 6,169,721 B1
(45) Date of Patent: Jan. 2, 2001

(54) TWO-DISC LAMINATED OPTICAL RECORDING MEDIUM

(75) Inventors: Toshihiko Takishita; Shinichi Hanzawa; Shigenori Murakami; Atsushi Kondo; Ayumi Mitsumori; Miki Kusama; Makoto Matsukawa, all of Yamanashi-ken (JP)

(73) Assignees: Pioneer Electronic Corporation, Tokyo; Pioneer Video Corporation, Nakakoma, both of (JP)

( * ) Notice: Under 35 U.S.C. 154(b), the term of this patent shall be extended for 0 days.

(21) Appl. No.: 09/140,545

(22) Filed: Aug. 26, 1998

(30) Foreign Application Priority Data

| Aug. 27, 1997 | (JP) | 9-246232 |
| Sep. 2, 1997 | (JP) | 9-252860 |
| Sep. 30, 1997 | (JP) | 9-282524 |

(51) Int. Cl.$^7$ .................. G11B 7/24; B32B 3/00
(52) U.S. Cl. .................. 369/275.4; 369/275.1; 428/64.1
(58) Field of Search .................. 369/275.1, 275.3, 369/275.4, 13, 283, 288; 428/64.1, 64.2, 64.4, 64.7, 64.8, 457

(56) References Cited

U.S. PATENT DOCUMENTS 5,955,168 * 9/1999 Min et al. .................. 428/64.1

* cited by examiner

*Primary Examiner*—Ali Neyzari
(74) *Attorney, Agent, or Firm*—Arent Fox Kintner Plotkin & Kahn, PLC

(57) ABSTRACT

An optical recording medium has a substrate having an annular grooves, a recording layer including an organic coloring matter and formed on the substrate, and a metallic reflection layer. The recording layer has a thickness so as to have an absorbance between 0.65 and 0.75. Information is recorded in the recording layer by a laser beam having a wavelength between 600 and 700 nm, using an objective lens having a numerical aperture between 0.55 and 0.70.

7 Claims, 12 Drawing Sheets

TWO-DISC LAMINATED OPTICAL RECORDING MEDIUM

BACKGROUND OF THE INVENTION

The present invention relates to an optical recording medium, and more particularly to a recording medium on which information is recorded at high density by a laser beam having a comparatively short wavelength.

Heretofore, as an optical recording medium having a recording layer of an organic coloring matter, a CD-R is used with a laser beam having a recording and reproducing wavelength of 780 nm.

In order to enable the organic recording medium to be increased in recording density, the recording track pitch must be reduced and the width of a recording pit must also be reduced. In the case that a small pitch is accurately recorded on the recording truck having a narrow pitch, it is necessary to focus a small recording beam on the truck by restricting the distribution of the diffraction of the laser beam in the recording optical system. To this end, it is necessary to increase the numerical aperture (NA) of the objective lens, and to reduce the wavelength of the laser beam.

On the other hand, it is desirable to provide an optical recording medium having a recording layer on which information can be recorded by a laser beam having a wavelength smaller than 780 nm, 830 nm.

In the case of CD-R, if a laser beam having a wavelength shorter than 780 nm is focused on the disc at a pit smaller than the conventional pit, a sufficient reflectance can not be obtained. Consequently, the modulation factor of a high frequence (HF) signal which is obtained by the reflectance is extremely low, so that information is not adequately recorded and reproduced.

Furthermore, on the optical disc, the wobble groove is spirally formed so as to guide the laser beam to the truck.

The width and depth of the wobble groove are selected in accordance with the wavelength of the laser beam so that the jitter and reflectance are adjusted.

Therefore, the shape of the wobble groove must be determined so as to meet the short wavelength.

SUMMARY OF THE INVENTION

An object of the present invention is to provide an optical recording medium which is suitable for optical recording with a laser beam having a short wavelength, specifically a wavelength of 600–700 nm.

According to the present invention, there is provided an optical recording medium having a substrate having a spiral groove or annular grooves, prepits between the grooves, a recording layer including an organic coloring matter and formed on the substrate, and a metallic reflection layer, comprising the recording layer having a thickness so as have an absorbance between 0.65 and 0.75, whereby information can be recorded in the recording layer by a laser beam having a wavelength between 600 and 700 nm, using an objective lens having a numerical aperture between 0.55 and 0.70.

The organic coloring matter included in the recording medium is a complex of an azo compound.

The metallic reflection layer is made of a gold film, depth of the groove is between 140 and 160 nm, width thereof is between 0.25 and 0.35 μm.

These and other objects and features of the present invention will become more apparent from the following detailed description with reference to the accompanying drawings.

DETAILED DESCRIPTION OF THE PREFERRED EMBODIMENT

Figure 1:
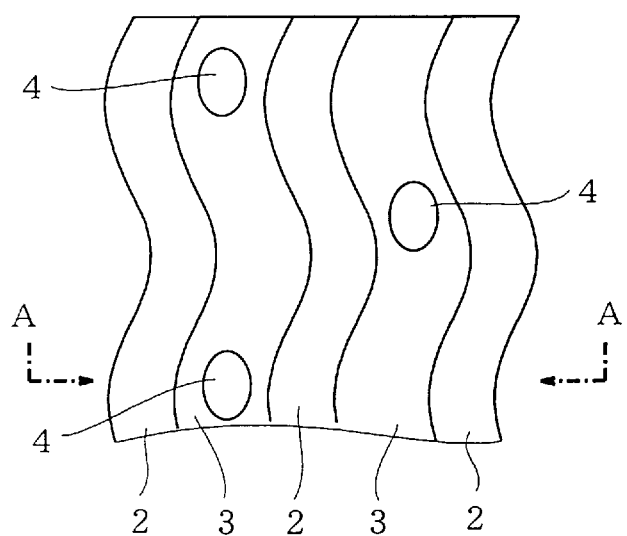
FIG. 1 is a plan view of an adhered double-sided optical recording medium, as a first embodiment of the present invention.
Figure 2:
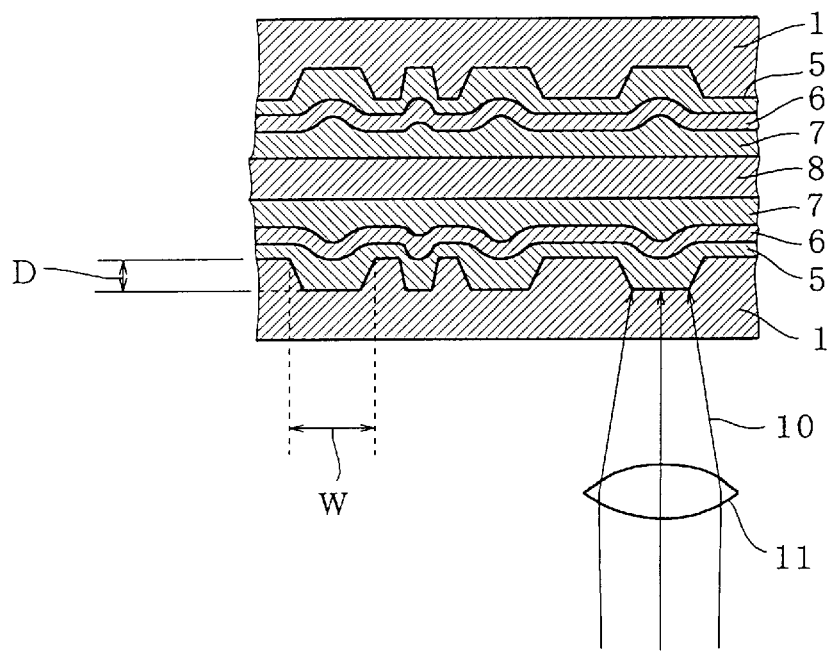
FIG. 2 is a sectional view taken along a line A—A of FIG. 1.

FIG. 1 is a plan view of an adhered double-sided optical recording medium, as a first embodiment of the present invention, and FIG. 2 is a sectional view taken along a line A—A of FIG. 1. The optical recording medium comprises a transparent substrate 1 having wobble grooves 2 and lands 3 on which prepits 4 are formed at regular spaces, a recording layer 5 on the substrate 1, including an organic coloring matter, a metallic reflection layer 6 on the recording layer 5, and a protecting layer 7. Both the mediums are adhered by an adhesive 8 to form the double-sided medium.

The optical recording medium of the present invention has a composition for recording and reproducing information by focusing a laser beam 10 having a wavelength between 600 and 700 nm with an objective lens 11 having a numerical aperture between 0.55 and 0.70.

The transparent substrate 1 is made of synthetic resin such as polycarbonate, polymethascrylate and others and has wobble grooves 2 for the servo system for guiding the laser beam, and prepits 4 formed on the lands 3 at a predetermined regular interval.

The wobble groove has a depth D of 140–180 nm and a width W of 0.25–0.35 μm, and has a U-shaped section. The truck pitch is between 0.7 and 0.9 μm.

In accordance with the present invention, the recording layer 5 includes an organic coloring matter film which is formed by spin-coating a solution in which an organic coloring matter which is a complex of an azo compound is solved in a solvent such as ethanol. The thickness of the organic coloring matter film is determined so that the absorbance (Abs) may be in a range between 0.65 and 0.75, preferably 0.68 and 0.73.

Figure 3:
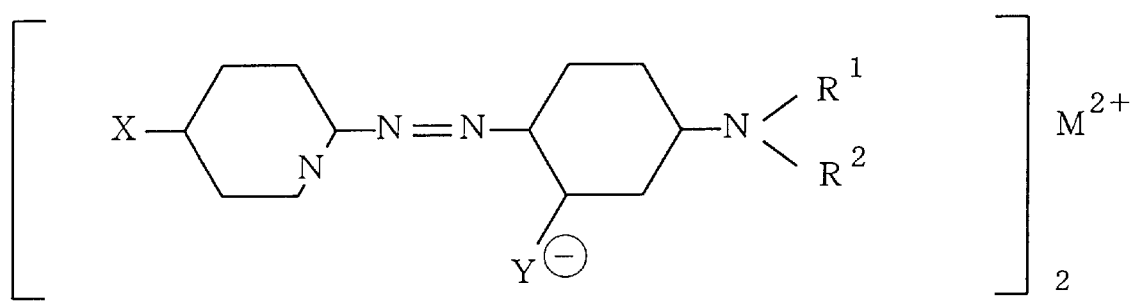
FIG. 3 shows a general formula of an organic coloring matter.

The complex of the azo compound is a metal including organic coloring matter expressed by a general formula of FIG. 3. In the general formula, X represents a substituent consisting of an electron-withdrawing group of para position orientation, for example Br, Cl, $CF_3$. Y represents a substituent consisting of hydroxyl group, carbonyl group, or sulfonic acid derivative. $R^1$ and $R^2$ are alkyl groups of the number of carbon of 1 to 6 which correspond to normal chain alkyl group the number of carbon of which is 1 to 6 and branching alkyl group of the number of carbon of 3 to 6. $M^{2+}$ represents ion of nickel, cobalt or copper.

The absorbance (Abs) is quantity represented by $\log_{10}(10/11)$ when the quantity of the light entering the recording layer is 10, and the quantity of the light transmitting the recording layer 5 is 11. Furthermore, the absorbance is relative to the optical path length (thickness d) of the recording layer, and represented by $\log_{10}(10/11) = \alpha \cdot d$, where $\alpha$ is the absorbance coefficient having a value determined by the recording layer.

It is desirable that the metal reflection layer 6 is formed by a gold thin film or silver thin film so that the reflectance is not reduced by the laser beam of 600–700 wavelength.

The protection film 7 is provided for preventing the reflection layer 6 from deforming which is caused by formation of recording portion. The protection film is preferably formed by a resin of ultraviolet ray setting type at a thickness of 4–15 μm.

Thus, in accordance with the present invention, an optical recording medium having reflectance, jitter of reproduce signal (HF signal), and modulation factor, each having a practical value (reflectance of more than 42%, jitter of less than 9%, modulation factor of more than 60%) can be provided.

EXAMPLE 1

The substrate 1 of polycarbonate having a thickness of 0.6±0.3 mm has wobble grooves 2 having a U-shaped section and a truck pitch of 0.8 μm, and prepits 4 on the land 3 between the wobble grooves. The recording layer 5 on the substrate consists of metal including organic coloring matter consisting of complex of the azo compound. The recording layer was formed by spin coating.

On the recording layer, the reflection layer 6 of gold having a thickness of 60 nm was formed by spin coating. On the reflection layer, the protection layer 7 of ultraviolet ray setting resin having a thickness of 10 m was formed by spin coating and hardened by ultraviolet ray.

Two sheets of thus formed discs were adhered with each other by an adhesive consisting of ultraviolet ray setting resin to produce a double-sided optical recording disc.

Various discs were made by changing the depth D of the wobble groove between 140 and 180 nm, the width W between 0.20 and 0.40 μm, the absorbance (Abs) of the recording layer between 0.60 and 0.75.

FIG. 4a to FIG. 5b show characteristic results of tests of the discs. In the tests, by a recording and reproducing machine using a semiconductor laser having a wavelength of 635 nm, recording of mark edge of 8/16 modulation with random signal was performed on the groove of each disc at the recording power 9 mW, the HF signal was reproduced.

Figure 4A:
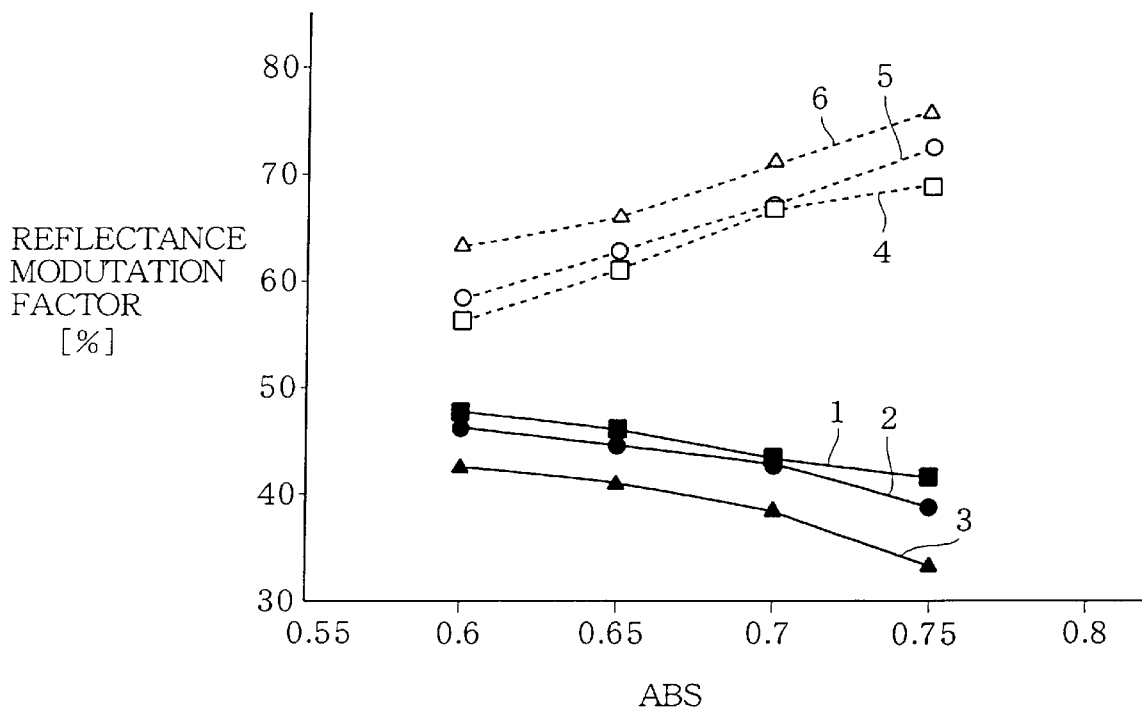
FIGS. 4a and 4b show reflectance, modulation factor, and jitter characteristics with respect to absorbance of the disc having a groove width of 0.30 μm, taking the groove depth as parameter.
Figure 4B:
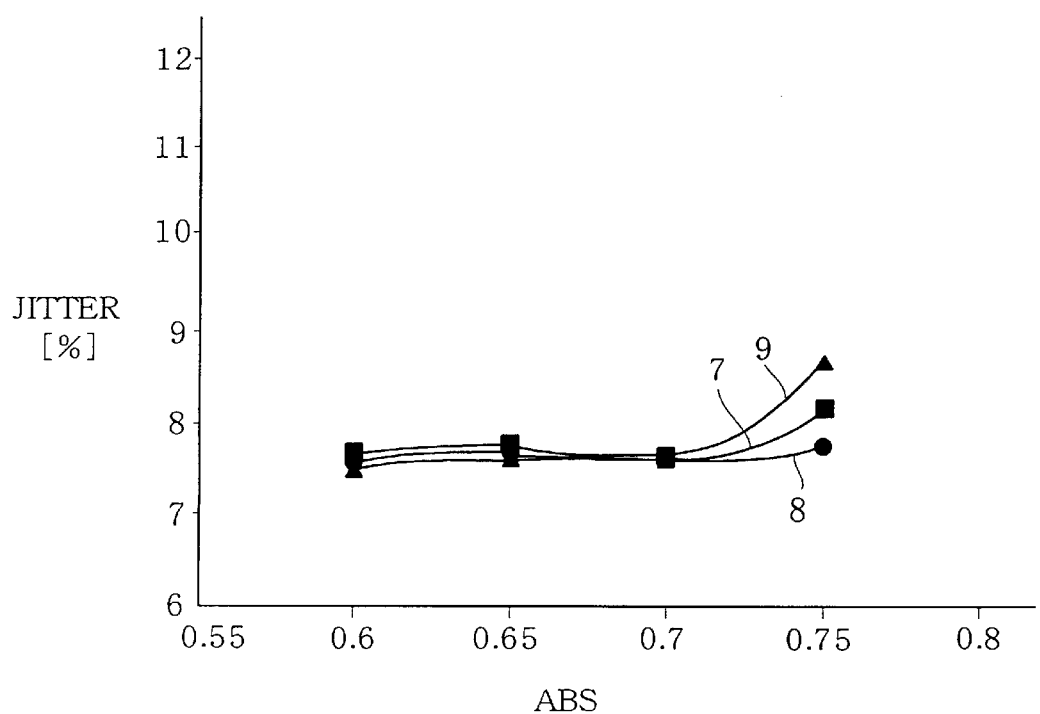

FIGS. 4a and 4b show reflectance, modulation factor, and jitter characteristics with respect to absorbance of the disc having a groove width of 0.30 μm, taking the groove depth as parameter. FIG. 4a shows characteristics of reflectance and modulation factor, and FIG. 4b shows characteristics of jitter.

In FIG. 4a, line 1 shows the characteristic of reflectance of the disc having a groove depth of 140 nm, line 2 shows at a groove depth of 160 nm, and line 3 shows at depth of 180 nm. Line 4 shows the characteristic of modulation factor of the disc having a groove depth of 140 nm, line 5 shows at a groove depth of 160 nm, and line 6 shows at depth of 180 nm.

In FIG. 4b, line 7 shows the characteristic of jitter of the disc having a groove depth of 140 nm, line 8 shows at a groove depth of 160 nm, line 9 shows at depth of 180 nm.

Figure 5A:
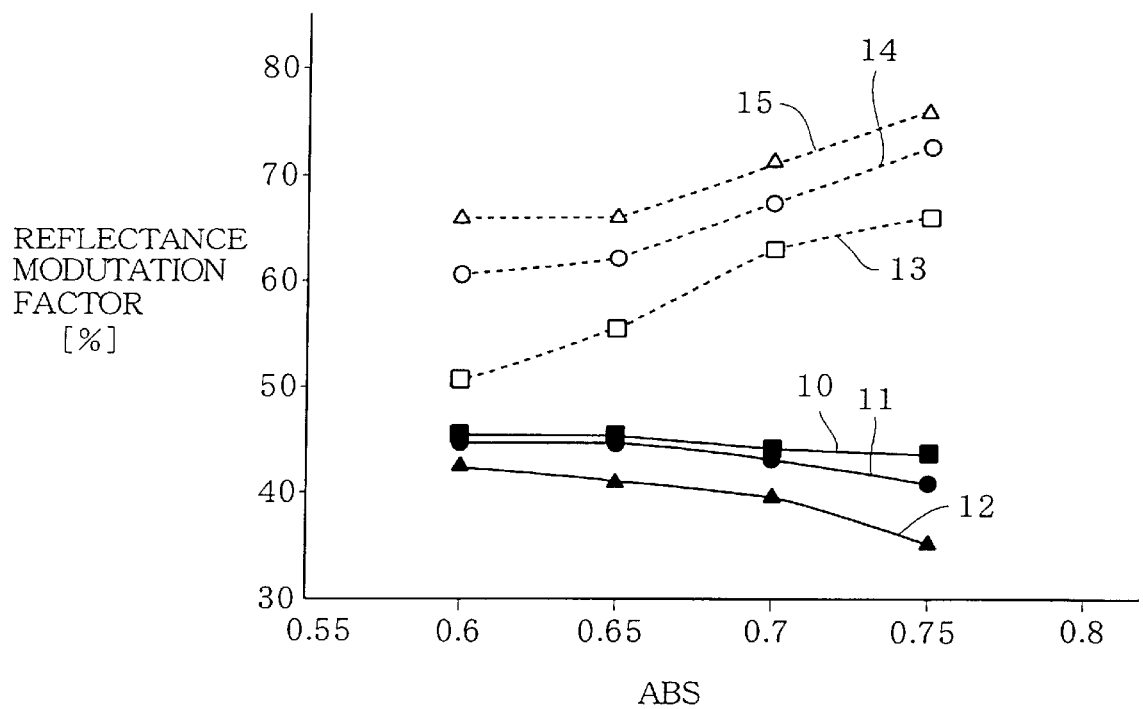
FIGS. 5a and 5b show reflectance, modulation factor, and jitter characteristics with respect to absorbance of the disc having a groove width of 0.35 μm, taking the groove depth as parameter.
Figure 5B:
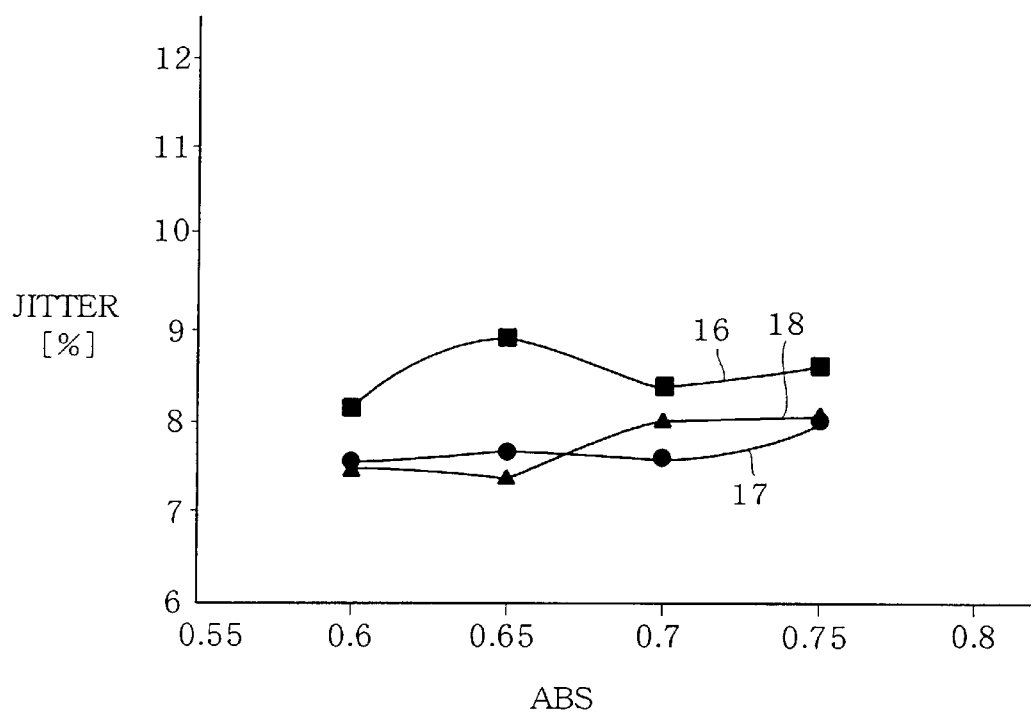

FIGS. 5a and 5b show reflectance, modulation factor, and jitter characteristics with respect to absorbance of the disc having a groove width of 0.35 μm, taking the groove depth as parameter. FIG. 5a shows characteristics of reflectance and modulation factor, and FIG. 5b shows characteristics of jitter.

In FIG. 5a, line 10 shows the characteristic of reflectance of the disc having a groove depth of 140 nm, line 11 shows at a groove depth of 160 nm, and line 12 shows at depth of 180 nm. Line 13 shows the characteristic of modulation factor of the disc having a groove depth of 140 nm, line 14 shows at a groove depth of 160 nm, and line 15 shows at depth of 180 nm.

In FIG. 5b, line 16 shows the characteristic of jitter of the disc having a groove depth of 140 nm, line 17 shows at a groove depth of 160 nm, line 18 shows at depth of 180 nm.

From FIGS. 4a to 5b, it will be understood that in the disc with a recording layer having such a thickness that the absorbance becomes 0.70, and having groove depth of 140 nm and groove width of 0.30 μm, the reflectance becomes 44%, modulation factor becomes 67% and jitter becomes 7.5%.

In the disc with a recording layer having such a thickness that the absorbance becomes 0.70, and having groove depth of 160 nm, and groove width of 0.30 μm, the reflectance becomes 43%, modulation factor becomes 67% and jitter becomes 7.5%.

In the disc with a recording layer having such a thickness that the absorbance becomes 0.70, and having groove depth of 160 nm and groove width of 0.35 μm, the reflectance becomes 43%, modulation factor becomes 67% and jitter becomes 7.6%.

These data evidence that the discs of the present invention have good characteristics.

In the case that the absorbance is less than 0.65 or more than 0.75, the reflectance does not exceed 42% and the modulation factor does not exceed 60% if the shape of the groove is changed. Hence, sufficient modulation factor and reflectance can not be obtained at recording.

Figure 6A:
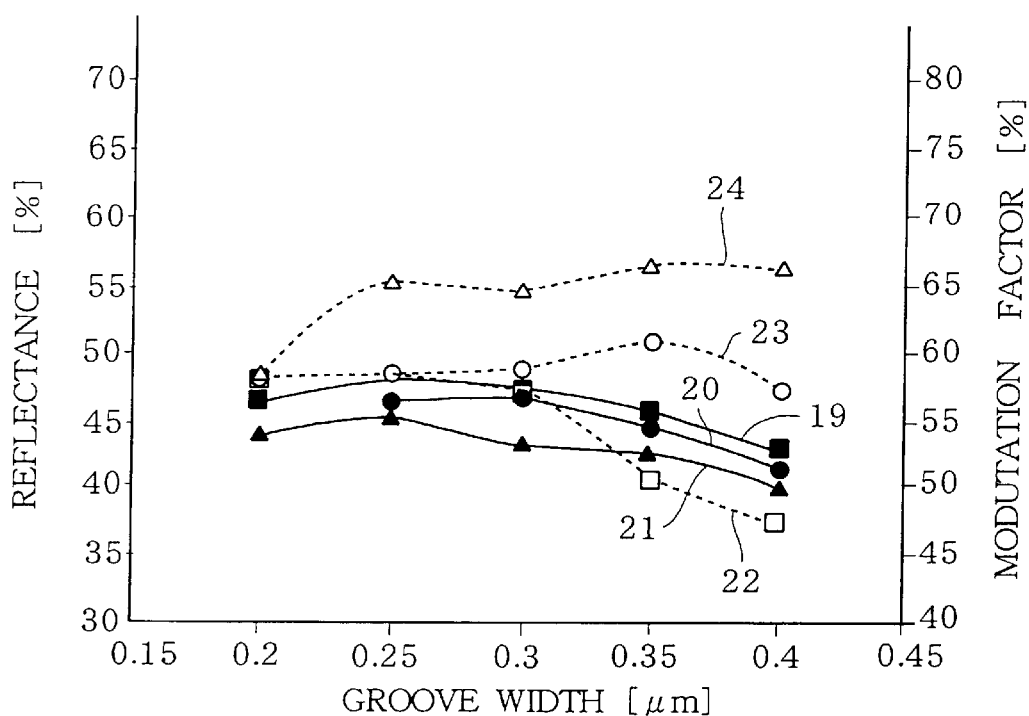
FIGS. 6a and 6b show reflectance, modulation factor, and jitter characteristics with respect to the width of the groove of the disc having an absorbance of 0.60, taking the groove depth as parameter.
Figure 6B:
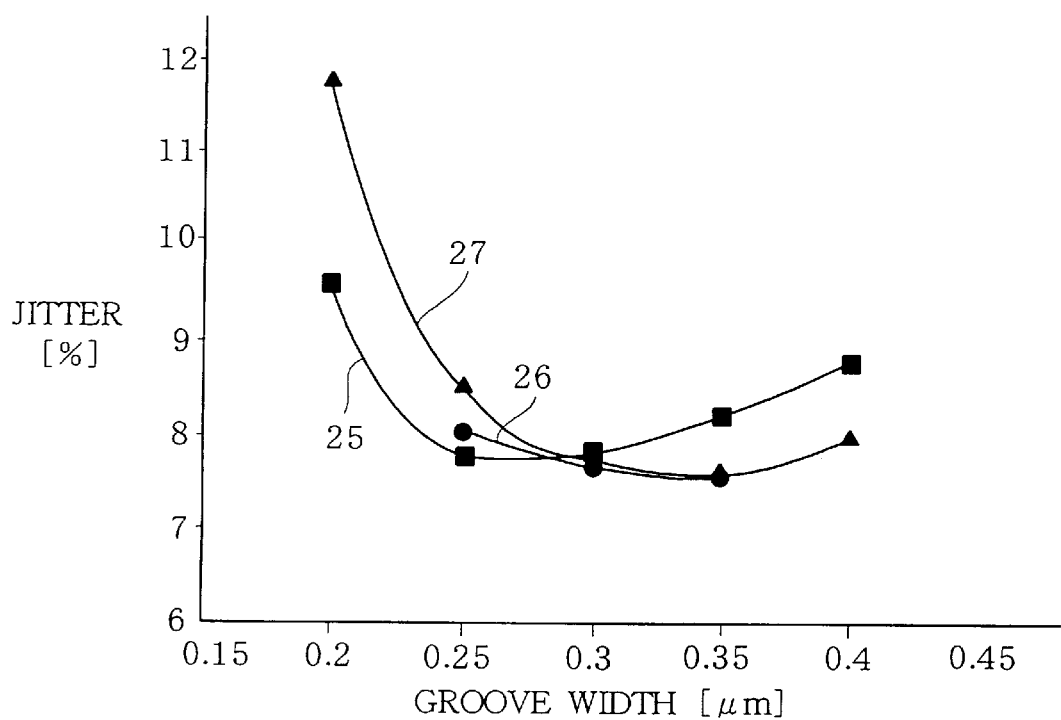

FIGS. 6a and 6b show reflectance, modulation factor, and jitter characteristics with respect to the width of the groove of the disc having an absorbance of 0.60, taking the groove depth as parameter. FIG. 6a shows characteristics of reflectance and modulation factor, and FIG. 6 shows characteristics of jitter.

In FIG. 6a, line 19 shows the characteristic of reflectance of the disc having a groove depth of 140 nm, line 20 shows at a groove depth of 160 nm, and line 21 shows at depth of 180 nm.

Line 22 shows the characteristic of modulatin factor of the disc having a groove depth of 140 nm, line 23 shows at a groove depth of 160 nm, and line 24 shows at depth of 180 nm.

In FIG. 6b, line 25 shows the characteristic of jitter of the disc having a groove depth of 140 nm, line 26 shows at a groove depth of 160 nm, line 27 shows at depth of 180 nm.

Figure 7A:
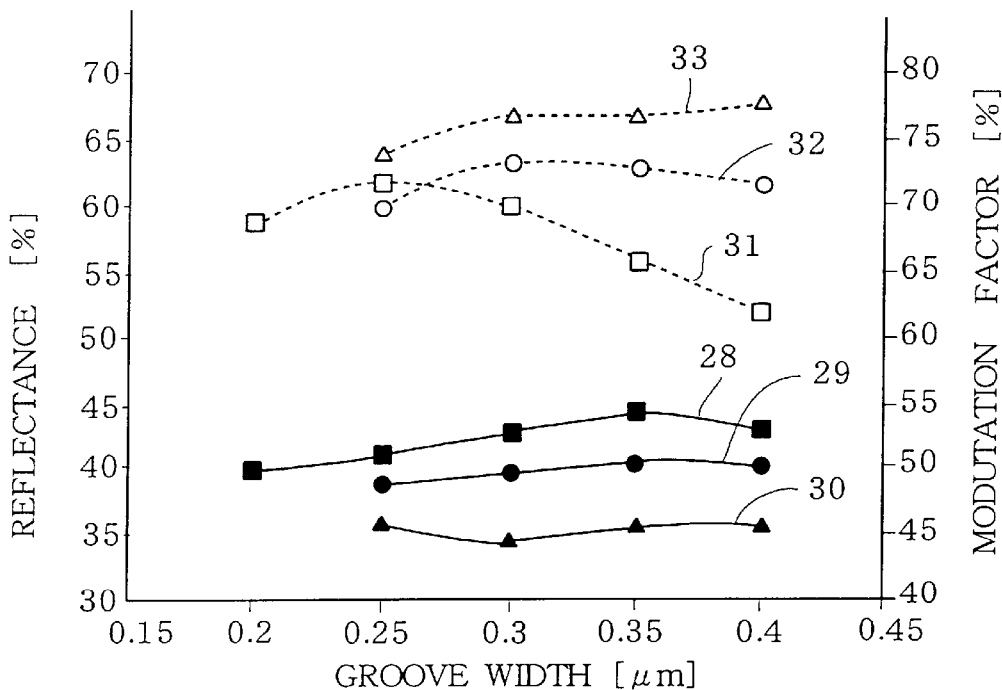
FIGS. 7a and 7b show reflectance, modulation factor, and jitter characteristics with respect to groove width of the disc having an absorbance of 0.70 taking the groove depth as parameter.
Figure 7B:
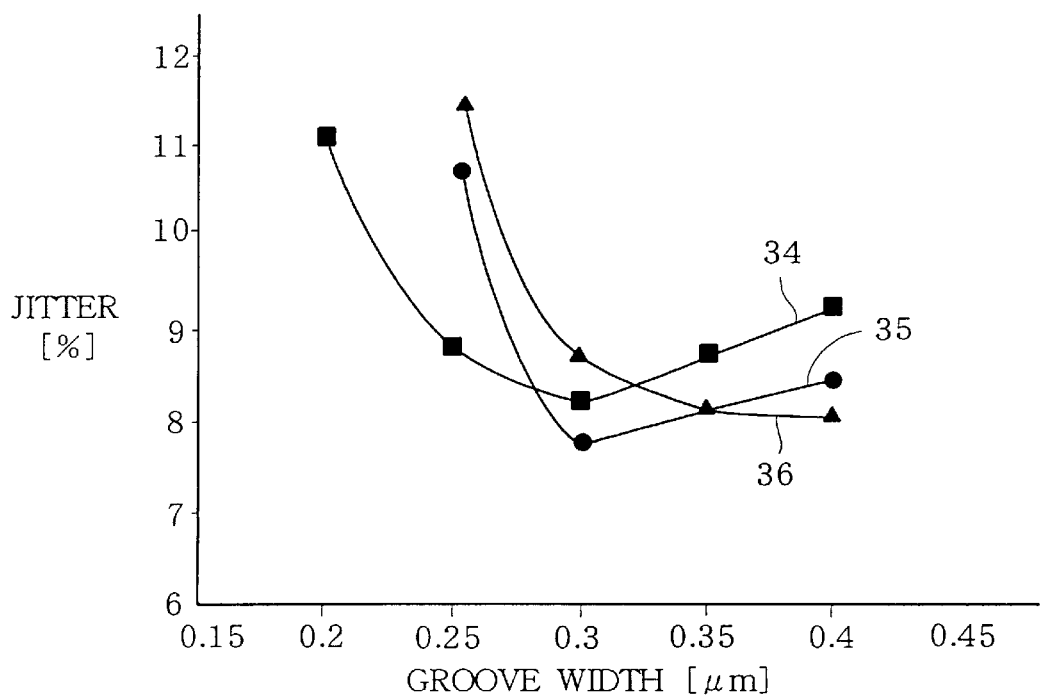

FIGS. 7a and 7b show reflectance, modulation factor, and jitter characteristics with respect to groove width of the disc having an absorbance of 0.70 taking the groove depth as parameter. FIG. 7a shows characteristics of reflectance and modulation factor, and FIG. 7b shows characteristics of jitter.

In FIG. 7a, line 28 shows the characteristic of reflectance of disc having a groove depth of 140 nm, line 29 shows at a groove depth of 160 nm, and line 30 shows at a depth of 180 nm.

Line 31 shows the characteristic of modulation factor of the disc having a groove depth of 140 nm, line 32 shows at a groove depth of 160 nm, and line 33 shows at depth of 180 nm.

In FIG. 7b line 34 shows the characteristic of jitter of the disc having a groove depth of 140 nm, line 35 shows ast a groove depth of 160 nm, line 36 shows at depth of 180 nm.

As will be understood from the foregoing, in the case of low absorbance, reflectance more than 42% and modulation factor more than 60% can not be obtained if the shape of the groove is changed. If the absorbance is high, the reflectance more than 42% can be provided, but modulation factor more than 60% can not be obtained.

In the case of the gold reflection layer, the disc is formed such that the depth of the groove becomes between 140 and 160 nm, width becomes 0.25–0.35 μm, preferably 0.30–035 μm. Furthermore, by selecting the thickness of the recording layer of the organic coloring matter so that the absorbance thereof becomes in the range between 0.65 and 0.75, it is possible to form an optical recording medium suitable for a short wavelength (specifically 600–700 nm).

EXAMPLE 2

In the EXAMPLE 2, the metal reflection layer is formed by silver, and other matters, namely depth, width and absorbance of the recording layer are changed in the same conditions as the EXAMPLE 1, thereby producing discs.

Figure 8A:
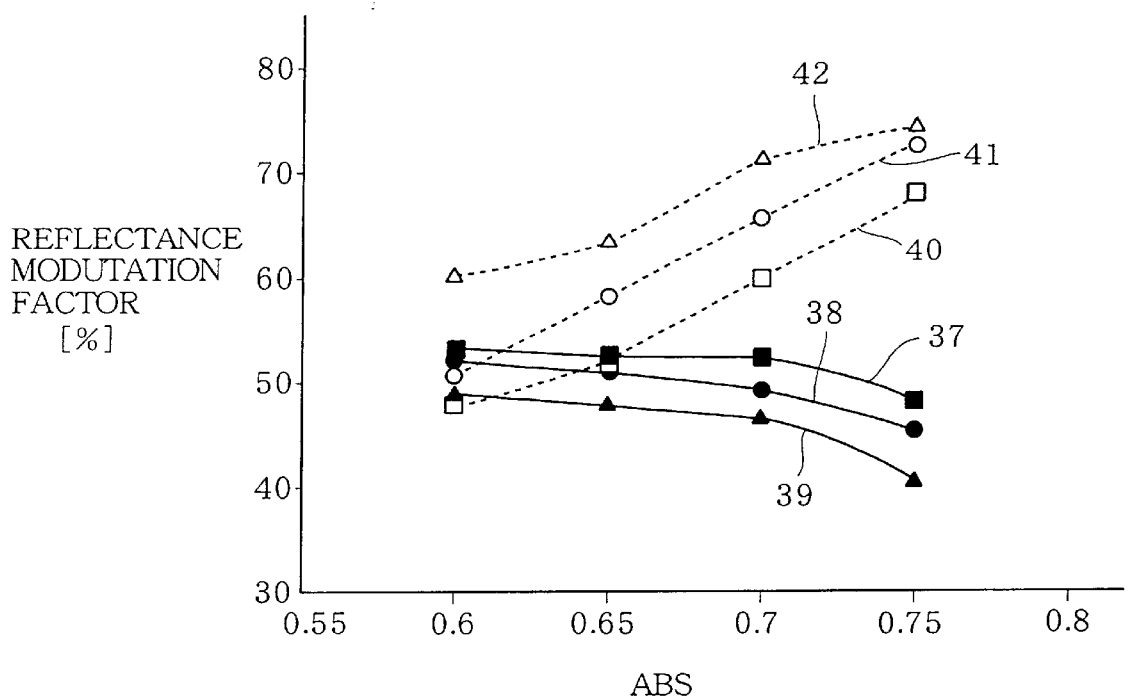
FIGS. 8a and 8b show reflectance, modulation factor, and jitter characteristics in the case of the disc having a groove width of 0.30 μm, taking the groove depth as parameter.
Figure 8B:
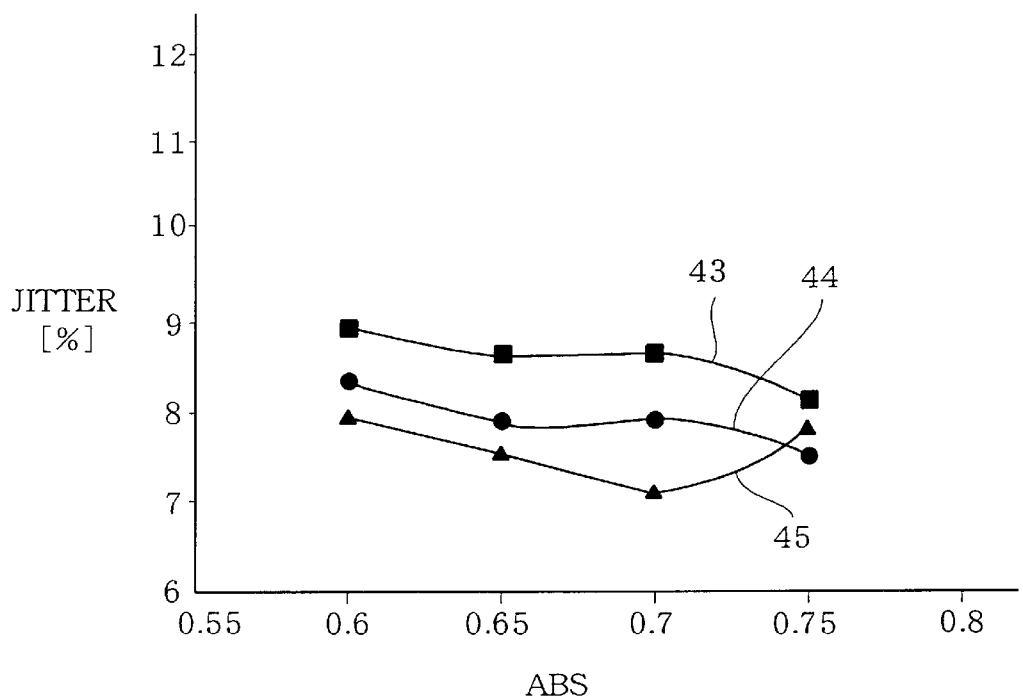

FIGS. 8a and 8b show reflectance, modulation factor, and jitter characteristics in the case of the disc having a groove width of 0.30 μm, taking the groove depth as parameter. FIG. 8a shows characteristics of reflectance and modulation factor, and FIG. 8b shows characteristics of jitter.

In FIG. 8a, line 37 shows the characteristic of reflectance of the disc having a groove depth of 140 nm, line 38 shows at a groove depth of 160 nm, and line 39 shows at depth of 180 nm.

Line 40 shows the characteristic of modulation factor of the disc having a groove depth of 140 nm, line 41 shows at a groove depth of 160 nm, and line 42 shows at depth of 180 nm.

In FIG. 8b, line 43 shows the characteristic of jitter of the disc having a groove depth of 140 nm, line 44 shows at a groove depth of 160 nm, line 45 shows at depth of 180 nm.

Figure 9A:
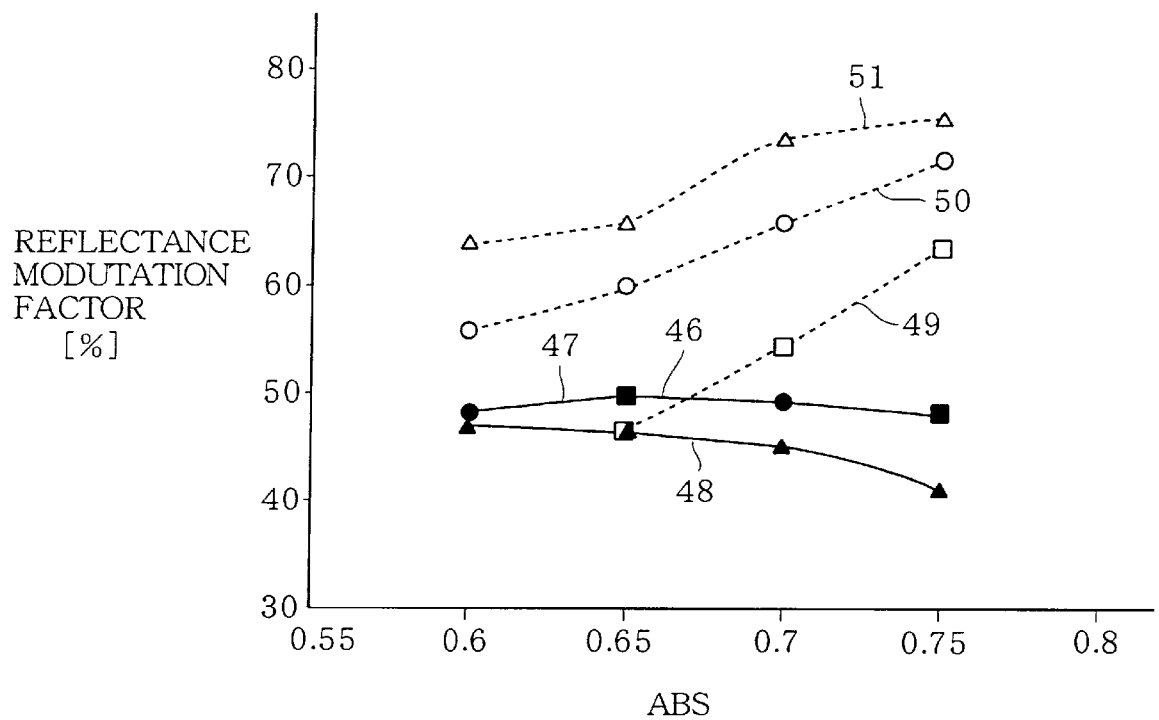
FIGS. 9a and 9b show reflectance, modulation factor, and jitter characteristics in the case of the disc having a groove width of 0.35 μm, taking the groove depth as parameter.
Figure 9B:
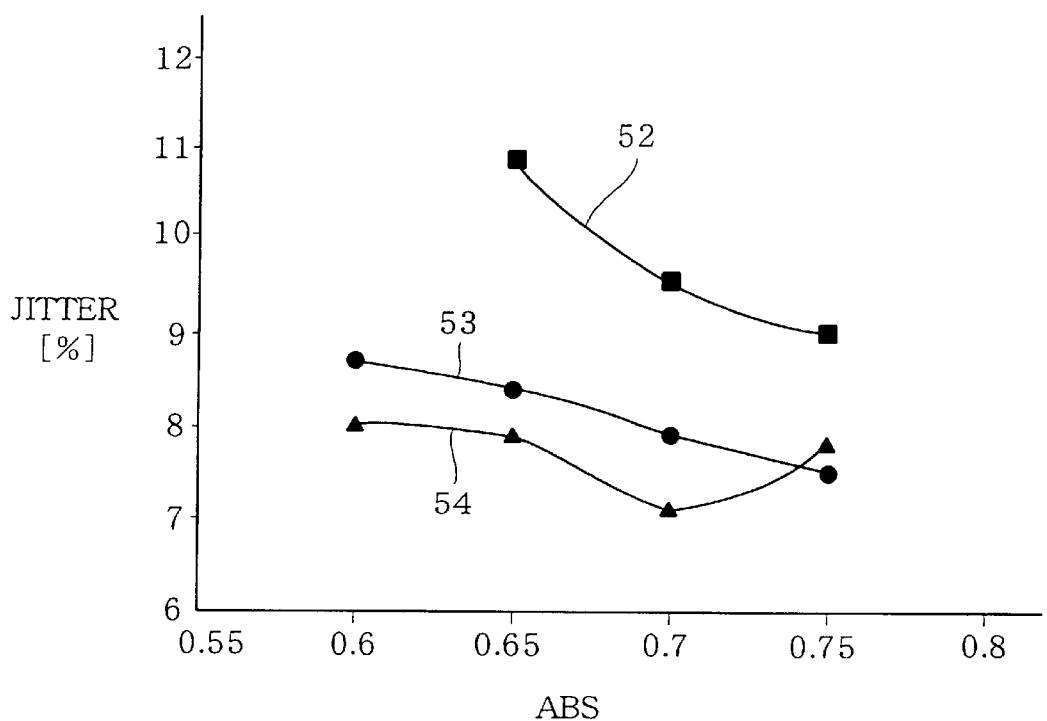

FIGS. 9a and 9b show reflectance, modulation factor, and jitter characteristics in the case of the disc having a groove width of 0.35 m, taking the groove depth as parameter. FIG. 9a shows characteristics of reflectance and modulation factor, and FIG. 9b shows characteristics of jitter.

In FIG. 9a, line 46 shows the characteristic of reflectance of the disc having a groove depth of 140 nm, line 47 shows at a groove depth of 160 nm, and line 48 shows at depth of 180 nm.

Line 49 shows the characteristic of modulation factor of the disc having a groove depth of 140 nm, line 50 shows at a groove depth of 160 nm, and line 51 shows at depth of 180 nm.

In FIG. 9b, line 52 shows the characteristic of jitter of the disc having a groove depth of 140 nm, line 53 shows at a groove depth of 160 nm, line 54 shows at depth of 180 nm.

From FIGS. 8a to 9b, it will be understood that in the disc with a recording layer having such a thickness that the absorbance becomes 0.75, and having groove depth of 160 nm and groove width of 0.3 μm, the reflectance becomes 45%, modulation factor becomes 74% and jitter becomes 7.6%.

In the disc with a recording layer having such a thickness that the absorbance becomes 0.75, and having groove depth of 160 nm, and groove width of 0.35 μm, the reflectance becomes 45%, modulation factor becomes 74% and jitter becomes 7.6%.

In the disc with a recording layer having such a thickness that the absorbance becomes 0.70, and having groove depth of 180 nm and groove width of 0.30 μm, the reflectance becomes 48%, modulation factor becomes 72% and jitter becomes 7.2%.

In the disc with a recording layer having such a thickness that the absorbance becomes 0.75, and having groove depth of 180 nm, and groove width of 0.35 μm, the reflectance becomes 45%, modulation factor becomes 74% and jitter becomes 7.2%.

These data evidence that the discs of the present invention have good characteristics.

In the case of the silver reflection layer, the disc is formed such that the depth of the groove becomes between 160 and 180 nm, width becomes 0.30–0.35 μm.

Furthermore, by selecting the thickness of the recording layer of the organic coloring matter so that the absorbance thereof becomes in the range between 0.68 and 0.75, it is possible to form an optical recording medium suitable for a short wavelength (specifically 600–700 nm).

The metallic reflection layer may be formed by adding other metals to gold or silver for increasing the liability such as weather resistance.

Figure 10:
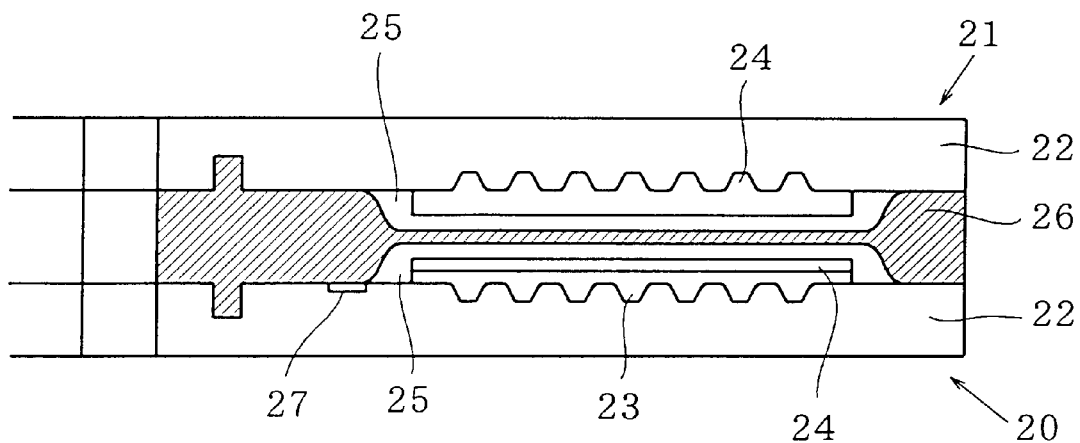
FIG. 10 is a sectional view of an adhered optical recording medium of the second embodiment of the present invention.

FIG. 10 is a sectional view of an adhered optical recording medium of the second embodiment of the present invention.

Heretofore, as the adhesive, the hot-melt type adhesive has been used. However, since the hot-melt type adhesive is thermoplastic, there is problems that the disc may be deformed and peeled from each other by heat. Therefore, the ultraviolet ray setting resin having a heat-resisting property may be used for adhering two discs. However, since the ultraviolet ray is applied to the resin passing through the substrate, reflection layer and protection layer, a large amount of the ultraviolet ray is reflected and absorbed by the layers. As a result, it takes a long time to solidify the resin.

In addition, an ultraviolet ray setting resin including material of the radical polymer as a main component is prevented from solidifying by oxygen. Therefore, if bubbles enter the resin, the resin is not completely solidified, results in small adhesive force.

The second embodiment resolves such defective problems.

The adhered optical disc of the second embodiment comprises a first disc 20 and a second disc 21. The first disc comprises a transparent substrate 22, a recording layer 23 on the substrate 22, a reflection layer 24, and a protection layer 25. The second disc 21 has the substrate 22, reflection layer 24, and protection layer 25. Both discs 20 and 21 are adhered by an adhesive 26. Thus, in the disc, recording is performed only on the first disc. In order to visually distinguish the surface of the first disc 20, a mark 27 is provided on the first disc 20.

The transparent substrate 22 is made, for example, of polycarbonate, and has a diameter of 120 mm and a thickness between 0.2 and 1.2 mm, for example, 0.6 mm.

The adhesive 26 consists of an ultraviolet ray setting resin including a cationic polymer system resin as a main component.

The adhesive 26 is formed by coating the ultraviolet ray setting resin by the spin coating method, or screen printing method, or roll coater method to form an adhesive layer having a thickness of 10–20 μm.

It is preferable to use an adhesive a slow solidifying property. Namely, it takes a long time to solidify the adhesive by the ultraviolet ray. For example, the ultraviolet ray setting resin "95A01X" of Sony Chemical Co. is used. The adhesive consists of a cationic polymer system resin as a main component, and is a white and opaque paste and has a viscosity of 50,000–100,000 cps at 25° C. The adhesive is painted on the substrate by the screen printing method and irradiated by the ultraviolet ray of 100–500 mj/cm².

A pain of substrates are overlapped, interposing the adhesive layers, and pressed to each other at a pressure of 50–500 gf/cm², thereby solidifying the adhesives. At that time, since it takes a long time to solidifying the adhesive, the adhesives are firmly and uniformly adhered to each other. Therefore, excessive stress does not generate in the adhesives.

The optical disc comprising a transparent substrate having a diameter of 120 mm and thickness of 0.6±0.03 mm has an effective recording and reproducing property when recording and reproducing by a laser beam having a wavelength of 600–700 nm, using an objective lens having a numerical aperture of 0.55–0.70.

Since the cationic polymer system resin is not prevented from solidifying by oxygen, the adhesive including the cationic polymer system resin as a main component is effectively solidified in a large adhesive force.

Figure 13:
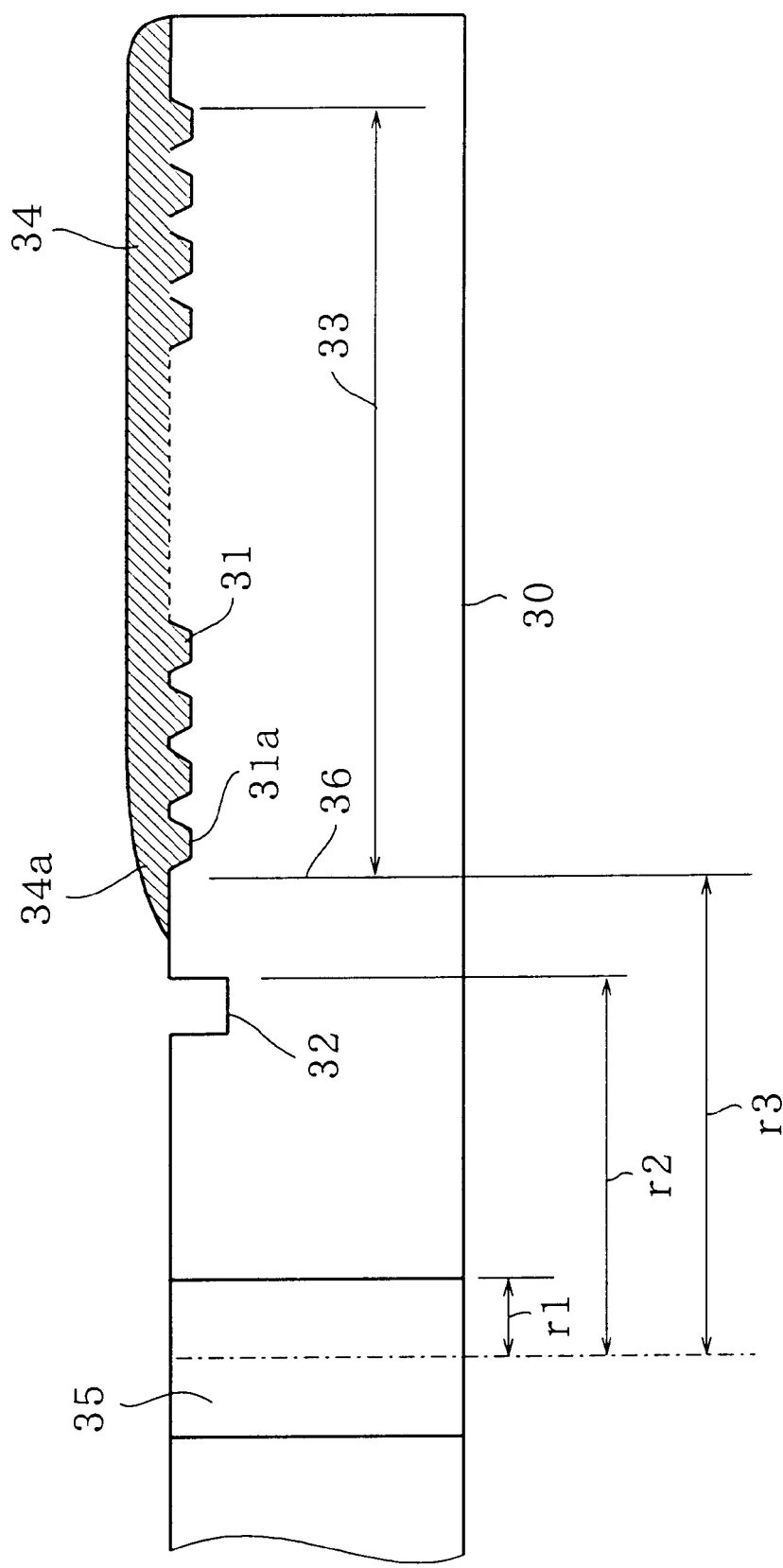
FIG. 13 is a sectional view of a transparent substrate of a conventional optical recording disc.

FIG. 13 is a sectional view of a transparent substrate of a conventional optical recording disc.

The substrate 30 has a spiral groove 31 formed in a recording area 33, and an inside annular groove 32 which is formed in molding of the substrate by an annular projection of a mold. On the recording area 33, a recording layer 34 including an organic coloring matter is formed by the spin coating method.

The radius r1 of a central hole 35 is 7.5 mm, an outer radius r2 of the annular groove 32 is 20 mm, and an inner radius r3 of an innermost groove 31a is 22.5 mm.

The inside groove 32 is formed at a radial position r2 satisfying the following condition.

$$r1 < r2 < (r1+r3)/2 + r1$$

Since an innermost edge 36 of the groove 31 is near the annular groove 32, an inner edge portion 34a of the recording layer 34 can not be formed so as to have a sufficient thickness, which renders the thickness unequal. Therefore, such an unequal thickness may cause the inner edge portion erroneous recording and reproducing.

Figure 11:
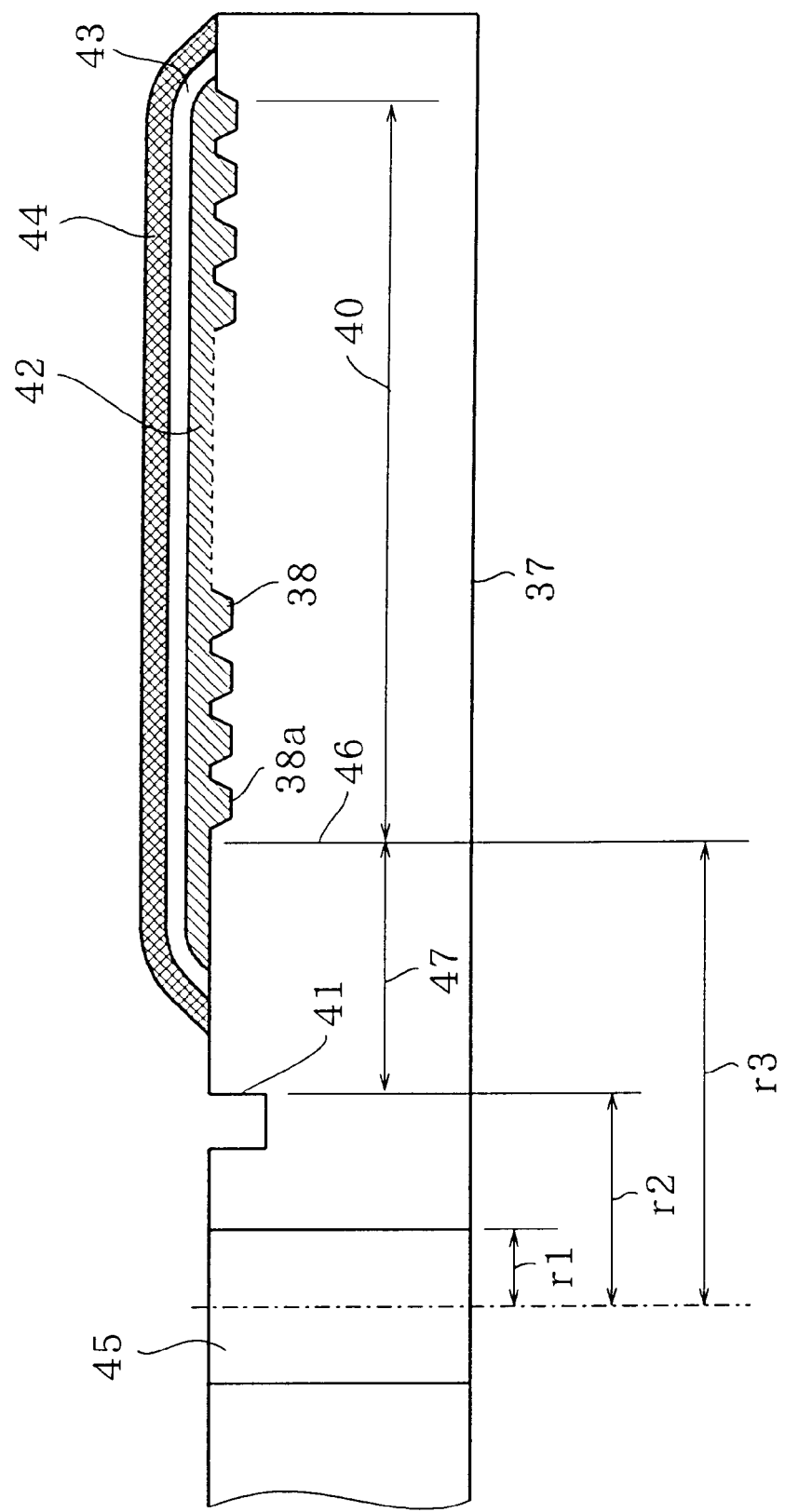
FIG. 11 is a sectional view of an optical disc according to the third embodiment of the present invention.

FIG. 11 is a sectional view of an optical disc according to the third embodiment of the present invention, which may remove the above described disadvantage.

The optical disc comprises a transparent substrate 37 having a spiral groove 38 formed in a recording area 40, and an inside groove 32.

On the recording area 40 a recording layer 42 including an organic coloring matter is formed by the spin coating method. Furthermore, a reflection layer 43 and a protection layer 44 are formed.

The radius r1 of a central hole 45 is 7.5 mm, an outer radius r2 of the annular groove 41 is 11 mm, and an inner radius r3 of an innermost groove 38a is 22.5 mm.

Since the annular groove 41 is positioned near the central hole 45, there is formed a large space 47 between the inner edge 46 and the annular groove 41. Therefore, the recording layer 42 can be formed in the space 47 so as to have a sufficient thickness as shown in FIG. 11 which has an equal thickness. Therefore, such an equal thickness ensures exact recording and reproducing.

Figure 12:
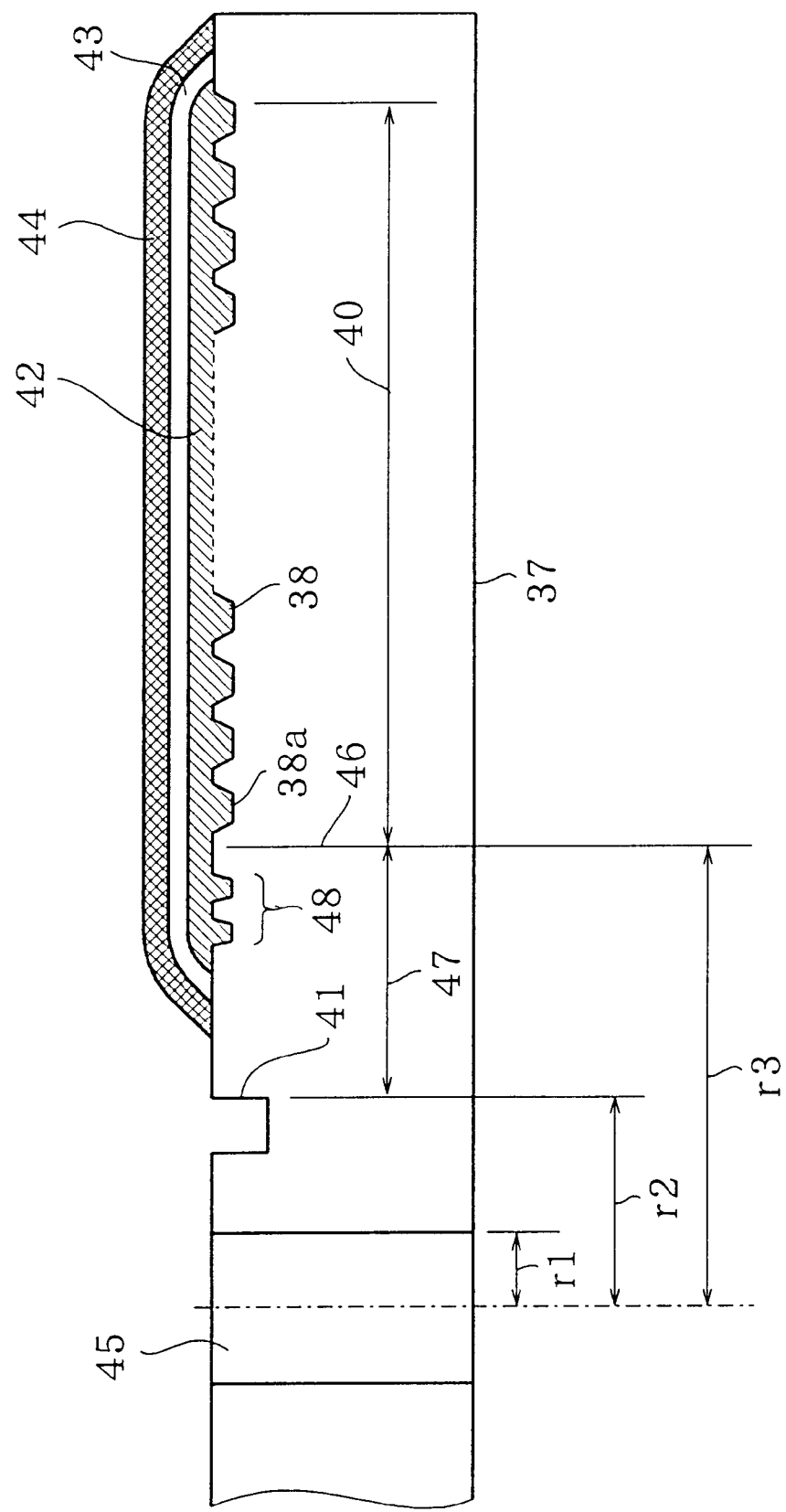
FIG. 12 is a sectional view of an optical disc according to a fourth embodiment of the present invention.

FIG. 12 is a sectional view of an optical disc according to a fourth embodiment of the present invention.

The same parts as FIG. 11 are identified with the same reference numerals as FIG. 11. In the substrate, dummy grooves or dummy pits 48 are formed adjacent the inner most groove 38a in the recording range 40.

Since the surface condition of the dummy grooves 48 is similar to that of the groove 38, the recording layer 42 becomes equal between both ranges.

The disc of each of FIGS. 11 and 12 may be formed into an adhered type disc such as the above described embodiments.

While the invention has been described in conjunction with preferred specific embodiment thereof, it will be understood that this description is intended to illustrate and not limit the scope of the invention, which is defined by the following claims.

What is claimed is:

1. An optical recording medium having a substrate having a spiral groove or annular grooves, prepits between the grooves, a recording layer including an organic coloring matter and formed on the substrate, and a metallic reflection layer, comprising:

the recording layer having a thickness so as to have an absorbance between 0.65 and 0.75, whereby information can be recorded in the recording layer by a laser beam having a wavelength between 600 and 700 nm, using an objective lens having a numerical aperture between 0.55 and 0.70, wherein the metallic reflection layer is made of gold film, depth of the groove is between 140 and 160 nm, width thereof is between 0.25 and 0.35 μm.

2. The optical recording medium according to claim 1 wherein the organic coloring matter included in the recording medium is a complex of an azo compound.

3. The optical recording medium according to claim 1 wherein the substrate has an annular groove between a recording area and a central hole, and the annular groove is located at a position near the central hole so that a large space is formed between the recording area and the annular groove.

4. An optical recording medium having a substrate having a spiral groove or annular grooves, prepits between the grooves, a recording layer including an organic coloring matter and formed on the substrate, and a metallic reflection layer, comprising:

the recording layer having a thickness so as to have an absorbance between 0.65 and 0.75, whereby information can be recorded in the recording layer by a laser beam having a wavelength between 600 and 700 nm, using an objective lens having a numerical aperture between 0.55 and 0.70, wherein the metallic reflection layer is made of a silver film, depth of the groove is between 160 and 180 nm, width thereof is between 0.30 and 035 μm.

5. The optical recording medium according to claim 3 wherein the substrate has an annular groove between a recording area and a central hole, and the annular groove is located at a position near the central hole so that a large space is formed between the recording area and the annular groove.

6. An optical recording medium having a substrate having a spiral groove or annular grooves, prepits between the grooves, a recording layer including an organic coloring mater and formed on the substrate, and a metallic reflection layer, comprising:

the recording layer having a thickness so as to have an absorbance between 0.65 and 0.75, whereby information can be recorded in the recording layer by a laser beam having a wavelength between 600 and 700 nm, using an objective lens having a numerical aperture between 0.55 and 0.70, wherein a protection layer is formed on the reflection layer so that a first optical disc is formed, and a second optical disc having the same structure as the first optical disc is adhered to the first optical disc by applying an adhesive to the protection layers of both optical discs, wherein the adhesive includes a cationic polymer system resin having a slow solidifying property.

7. The optical recording medium according to claim 6 wherein the adhesive includes a cationic polymer system resin having a slow solidifying property.

* * * * *